United States Patent [19]

Wenzel

[11] Patent Number: 4,614,349
[45] Date of Patent: Sep. 30, 1986

[54] TOOL FOR FLOOR COVERING INSTALLATION

[76] Inventor: Michael D. Wenzel, 2251 Clinton Ave. #E, Alameda, Calif. 94501

[21] Appl. No.: 630,394

[22] Filed: Jul. 13, 1984

[51] Int. Cl.$^4$ .............................................. B62D 61/12
[52] U.S. Cl. ...................... 280/43.1; 7/103; 280/9; 280/43.24; 280/47.18; 280/47.26; 280/47.29
[58] Field of Search .............. 280/47.18, 47.24, 47.26, 280/47.21, 8, 9, 11, 43.1, 43.14, 43.24, 47.29; 404/85, 86, 103, 118, 122; 172/170, 684.5; 7/103

[56] References Cited

U.S. PATENT DOCUMENTS

| 1,343,097 | 6/1920 | Spreyer | 172/684.5 |
|---|---|---|---|
| 1,855,108 | 4/1932 | Hoobler | 280/47.26 |
| 2,433,246 | 12/1947 | Stelzer | 280/8 |
| 2,926,021 | 2/1960 | Altodonna | 280/11 |
| 2,926,923 | 3/1960 | Browne | 280/8 |
| 3,046,031 | 7/1962 | Reynolds | 280/8 |
| 3,594,932 | 7/1971 | Eriksson | 280/47.26 |
| 3,927,894 | 12/1975 | Zawislak | 280/8 |

Primary Examiner—John J. Love
Assistant Examiner—Joseph G. McCarthy
Attorney, Agent, or Firm—Thomas M. Freiburger

[57] ABSTRACT

A combination hand truck and tool for use in installing floor coverings of the glued-down type, such as carpet or linoleum utilizes the weight of the installer's tool box for pressing the floor covering to the floor, in lieu of a weighted roller ordinarily carried by the installer. Retractable wheels and a pivotable, adjustable position handle enable the device to be used as either a press, riding on glides that contact the floor covering, or as a hand truck for carrying the installer's tools and supplies.

15 Claims, 7 Drawing Figures

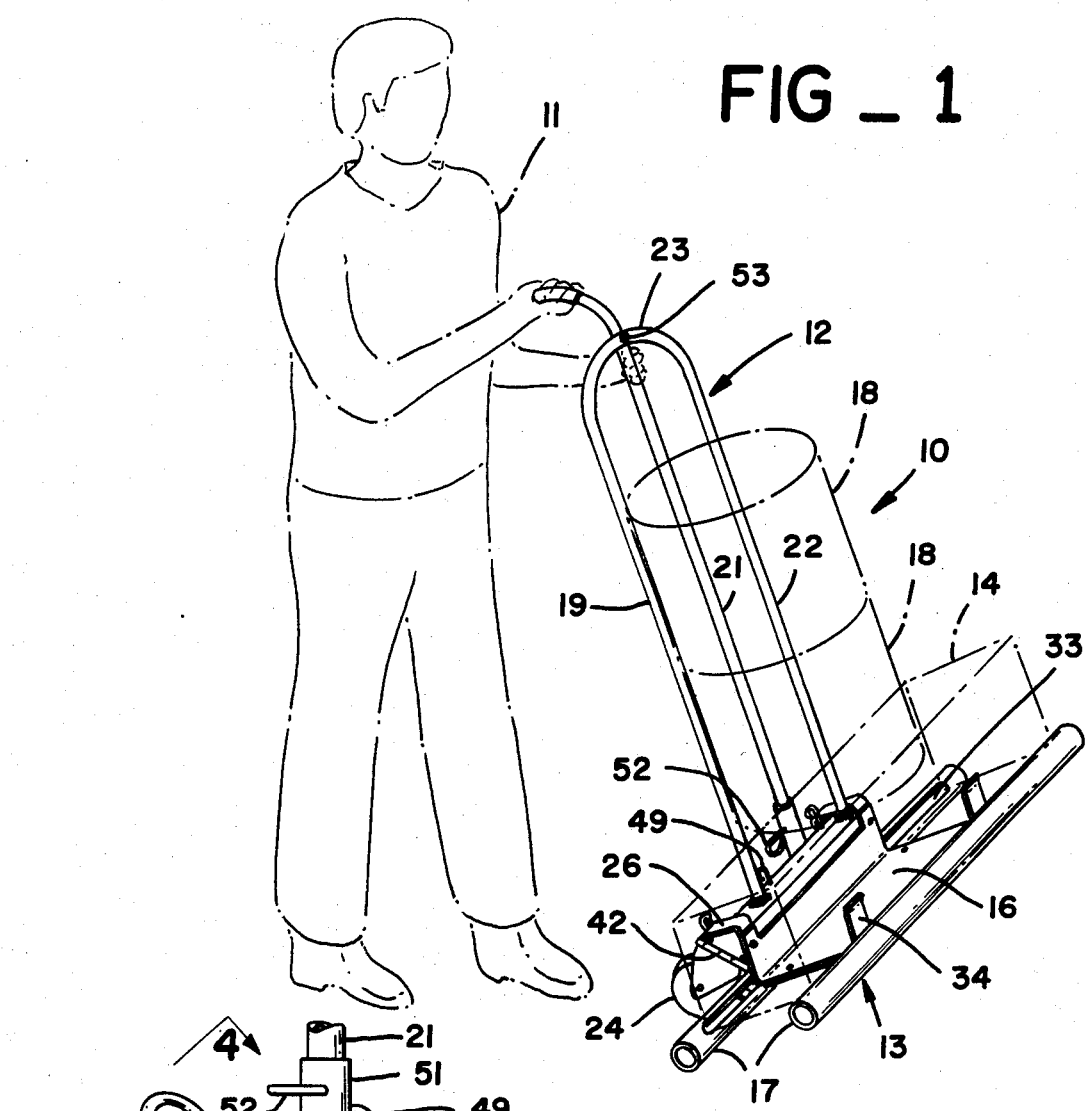
FIG _ 1
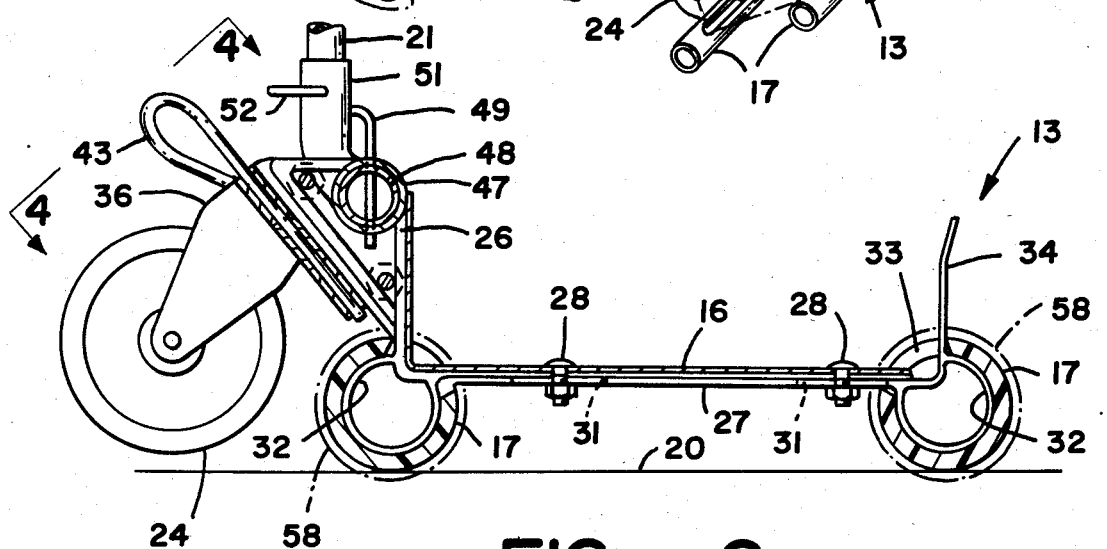
FIG _ 2

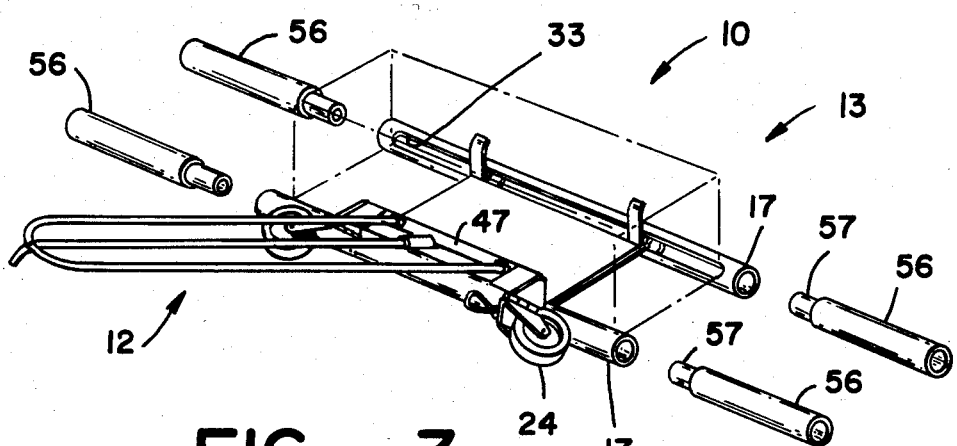
FIG _ 3
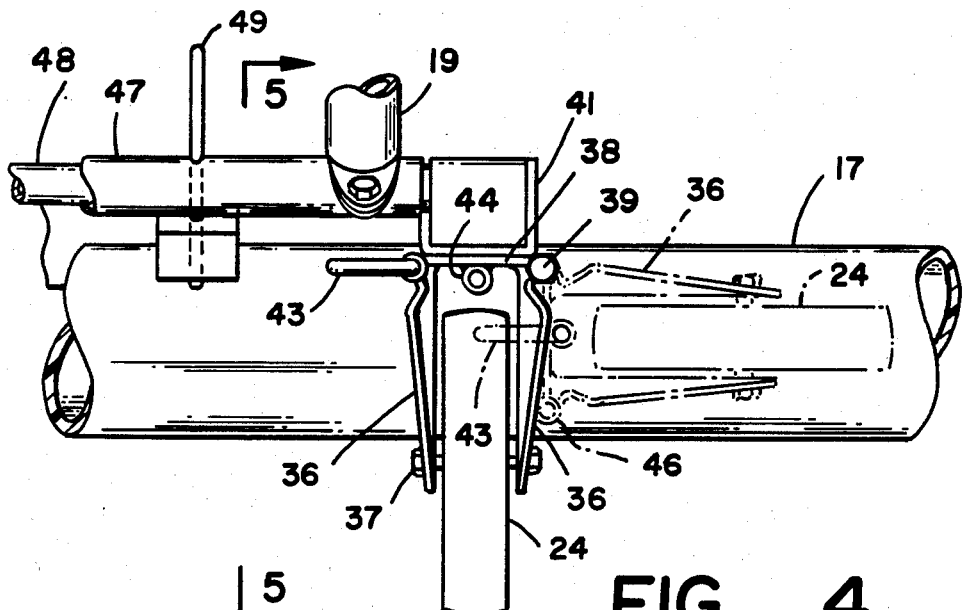
FIG _ 4
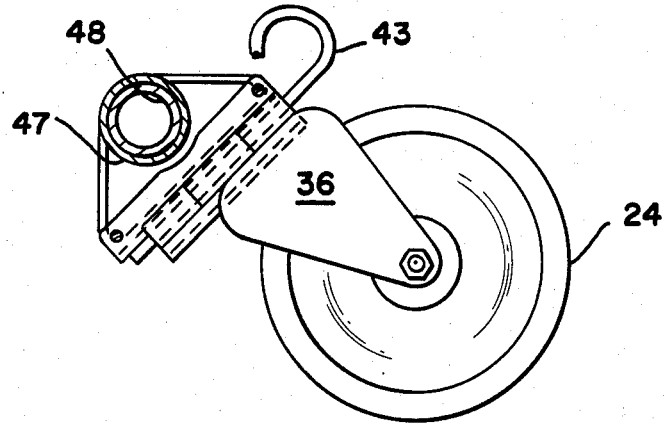
FIG _ 5

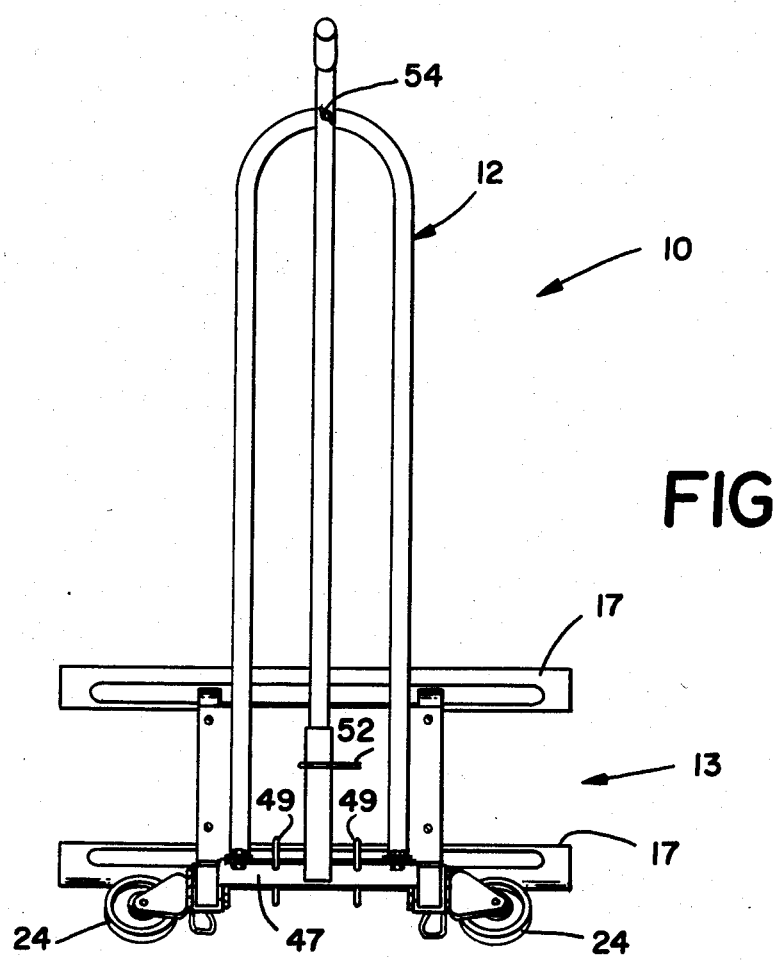
FIG_6
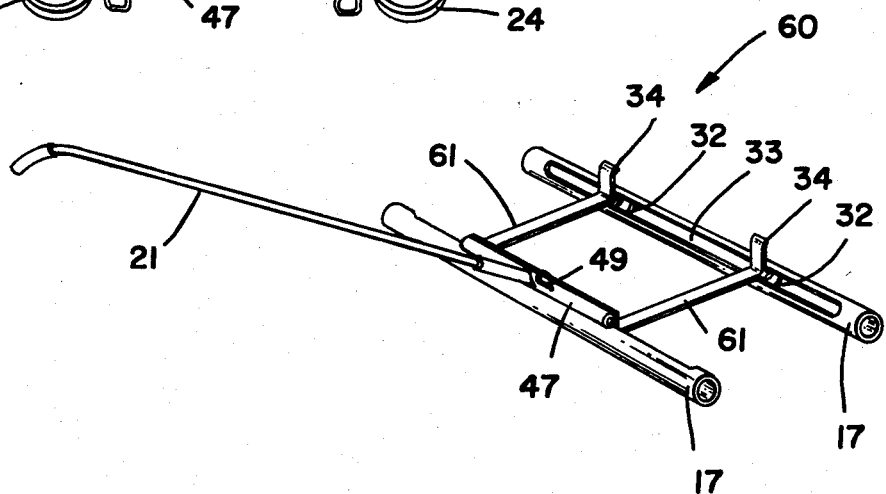
FIG_7

TOOL FOR FLOOR COVERING INSTALLATION

BACKGROUND OF THE INVENTION

The invention relates to floor covering installation tools, and more particularly to a combination hand truck and press for use with glue-down type floor coverings such as carpet and linoleum.

An installer of glue-down carpeting or linoleum has traditionally been required to carry a heavy pressing roller as part of his equipment, since the carpet or linoleum must be pressed into tight adhesion with the floor surface. In addition, the installer must bring to the job a considerable bulk of tools and other supplies such as adhesives. It has not been possible for the installer to transport all of his equipment and supplies to and from his vehicle in one load, which can cause him to expend considerable additional time in some instances.

There has not been available any piece of equipment that would enable the installer to economize time and effort by allowing the use of fewer tools and the transporting of all tools and supplies together for a job.

There have been disclosed several types of carts or carrying devices having wheels which are used only part of the time, or for one function of a multiple-function implement. These include devices shown in U.S. Pat. Nos. 2,926,021, 3,594,932, 2,433,246, 1,855,108, 3,046,031, and 2,926,923. Of these patents, Hoobler U.S. Pat. No. 1,855,108 and Seltzer U.S. Pat. No. 2,433,246 each disclose a combination hand truck and linoleum roller, where an additional weight may be put on the hand truck for bearing down on the linoleum.

Eriksson U.S. Pat. No. 3,594,932 shows a combination snow shovel and garden cart, with retractable wheels, and in FIG. 5 the angular position of the cart's handle is shown to be adjustable. Reynolds U.S. Pat. No. 3,046,031 shows a hand truck type device which glides over soft surfaces, but rolls on wheels over hard surfaces. However, it is not used as a pressing implement. U.S. Pat. Nos. 2,926,021 and 2,926,923 also show carrying devices which may glide on skids or use wheels. In the former, the wheels can be swung upwardly; however, in neither is the gliding designed to press a floor covering down to aid adhesion.

It is among the objects of the present invention to provide a new implement for use in glue-down floor covering installation, wherein the same implement may be used as a hand truck to carry tools and supplies to the job, then be used on the job, with the weight of the installer's tool box, and tools, to glide over the floor covering and press it into tight adhering engagement with the floor surface.

SUMMARY OF THE INVENTION

According to the present invention, a hand truck and tool for use in installing floor coverings comprises a handle portion and a load-carrying portion pivotally connected to the handle portion along a horizontal pivot axis, with means for receiving a tool box of floor covering installation tools, and with a pair of floor covering engaging glides at the bottom of the load-carrying portion. The glides are positioned to engage the surface of a floor covering material to slide over it and press the backing into tight engagement with the adhesive when the glides are moved over the floor covering surface with the weight of the tool box on the load-carrying portion. There is included a means associated with the handle and the load-carrying portion for selectively locking the handle portion in a full upright position when desired, for use as a hand truck. A pair of wheels are connected to the load-carrying portion behind the glides, for contacting the floor or other surface when the hand truck is tipped back.

The glides may be used in two positions. The first position is with both glides coming in contact with the floor covering and the second position is with only the back glide coming in contact for the purpose of applying greater pressure.

In a preferred embodiment, the wheels are connected to the load-carrying portion such that they are normally elevated above the floor when the glides are in contact with the floor. The wheels may include means for swinging each of them up away from the floor, along an axis perpendicular to the wheel's axis of rotation.

The handle portion may be formed such that there is a vertically-extending recess for nesting a stack of cylindrical drums of adhesive material, supported on top of the tool box, when the apparatus is used as a hand truck with the handle portion in full upright position. It can also be used for moving other trade materials such as carpet, supplies, etc.

The floor covering engaging glides may comprise a pair of parallel tubular members with a platform between and connected to the two glides, with each glide having an elongated cutout area oriented upwardly and inwardly toward the platform, such that the bottom of the tool box fits closely within the cutout areas, so that the tool box is cradled and held in position against movement on the platform.

The unit generally weighs approximately 15 lbs., while a prior-art roller weighs a minimum of 75 lbs., which is extremely dangerous while driving and difficult when moving from truck to jobsite. Floor covering manufacturers state in their specifications that materials should be rolled or pressed, but the rollers often have not been used because of these difficulties, resulting in improper installations.

In a simpler embodiment of the invention, the implement comprises simply a press for use in installation of glue-down floor coverings, still utilizing the weight of the installer's tool box to press the floor covering. In this embodiment the implement comprises a pair of parallel, spaced apart floor covering engaging glides, oriented transversely to the path of travel of the press, structural members connected to and extending between the glides, and positioned to support the tool box, and a handle, pivotally connected to the structural members along a horizontal pivot axis and extending generally rearwardly from the glides for pushing the press along a floor covering with the tool box held thereon for weight.

There are included means associated with the handle and structural members for selectively locking the handle and the structural members and glides in a folded-together position for carrying and storage, and for selectively permitting free pivoting of the handle with respect to the structural members. The implement also includes means for cradling the tool box on the press to hold it in position against movement side-to-side and fore-and-aft.

With the implement of the invention, installation of glue-down floor coverings is made more efficient and economical of the installer's time, as well as easier physically on the installer with respect to transporting of his various tools. These and other objects, advantages, features and characteristics of the invention will be apparent from the following description of preferred embodiments, considered along with the accompanying drawings.

DESCRIPTION OF THE DRAWINGS

FIG. 1 is a perspective view showing an installer wheeling the implement of the invention as a hand truck, transporting his floor covering installation tools and supplies on the hand truck.

FIG. 2 is an elevation view in section, showing the construction of a load-carrying portion of the invention.

FIG. 3 is a perspective view showing the implement of the invention with wheels retracted and in position for use as a floor covering pressing tool, and also indicating glide extensions which may be added to the implement.

FIG. 4 is a partial detailed view in elevation showing the mechanism by which the wheels may be retracted, as viewed from the rear of the implement, along the line 4—4 in FIG. 2.

FIG. 5 is another partial view in sectional elevation, showing the wheel mechanism, as viewed along the line 5—5 in FIG. 4.

FIG. 6 is an elevation view showing the implement folded up with the handle portion against the load-carrying portion, for lifting into a vehicle and for storage.

FIG. 7 is a perspective view showing another, simpler embodiment of the invention, wherein the hand truck function is eliminated, but which is otherwise similar to and interchangeable in components with the first embodiment.

DESCRIPTION OF PREFERRED EMBODIMENTS

In the drawings, FIG. 1 shows a tool or implement 10 in accordance with the invention, in use as a hand truck and operated by a user 11 (broken lines). The implement 10 includes a handle portion 12 and a load-carrying portion 13. The installer's tool box 14 is carried by the hand truck as shown, on a platform 16 of the load-carrying portion between a pair of floor covering contacting glides 17. Several drums 18 of supplies, such as floor-covering adhesive, are shown stacked on top of the tool box 14. The handle portion 12 may comprise three bars 19, 21 and 22, the center bar 21 being recessed slightly behind the outer bars 19 and 22 so as to form a recess for receiving the rounded drums 18 on the hand truck. The outer bars 19 and 22 may be integral as shown, connected by an arch portion 23 at the top, to which the back, center bar 21 is bolted.

The load-carrying portion 13 includes a pair of wheels 24 as shown, for use of the implement 10 in the hand truck mode.

FIGS. 1, 2 and 3 illustrate the construction of the load-carrying portion 14 of the implement of the invention, shown resting on a floor 20 in FIG. 2. Structural members 26 may be formed as shown, at each side of the implement, to extend generally between the two glides 17 as a relatively narrow structural piece. Beneath the horizontal part of each member 26 may be a similar structural piece 27, of similar width, overlapping the member 26 as shown and extending forward to the forward glide 17. Above the member 26 is the platform 16, comprising a flat pan supported by the pairs of structural pieces below, all being bolted together by bolts 28, with slotted holes 31 in the lower structural piece 27 to enable adjustment of the width of the platform so that different widths of tool boxes 14 and materials can be accommodated.

As also illustrated in FIGS. 1–3, the glides 17 may be held in place with rigid circular retainers 32 which extend from the structural members 26 for the rear glide, and from the lower structural pieces 27, for the forward glide, and are fitted tightly into the tubular glides 17. The glides 17 may comprise a somewhat flexible plastic material, such as PVC, slotted as shown with elongated slots 33 for the seating of the tool box edges and corners, and the rigid circular retaining components 32 may be press-fit into the somewhat flexible tubes. Each of the circular retainers 32 is short in length, preferably about the same dimension as upwardly extending stops 34 at the front of the device, also secured to the lower structural pieces 27 and positioned to help retain the tool box 14 in place. The connection between the metal circular retainers and the plastic tubing is an important feature of the invention. It adds strength to the tubing and is an efficient way to retain the tubing to the frame without the use of screws, bolts or other fasteners.

The details of construction of the wheels 24 and associated components are best seen in FIGS. 2, 4 and 5. Each wheel 24 is mounted between flanges 36, on an axle 37 between the flanges, similarly to a caster wheel. FIG. 4 shows that the two flanges 36 are connected at the top by a transverse piece 38, and that this assembly is hinged by a hinge pin 39 to base structure 41, which together with the flange 36 forms a hinge 42, better seen in FIG. 1. The wheel assembly may be swung upwardly to the right, as viewed in FIG. 4, about the hinge pin 39, so that it is well away from the floor when the carpet or linoleum is being pressed down with the glides 17. The wheel may be locked in this position using a locking pin 43 which is slipped through an eye opening 44 connected to the wheel assembly, and on into an opening provided in the glide 17 (or other appropriate fixed structure) for this purpose. FIG. 3 shows the wheels 24 swung upwardly for use of the implement 10 as a press.

FIGS. 4 and 5 also illustrate that the wheel assembly may be locked by the lock pin 43 in the normal, wheel-down position shown in solid lines. The lock pin is slipped through one or more aligned eye openings 46 on the left side of the wheel assembly as viewed in FIG. 4, and through corresponding hinge-like eye structure associated with the base structure 41 of the implement.

As mentioned above, the handle portion 12 of the implement 10 may be locked in a right-angle, upright position with respect to the load-carrying portion 13, as shown in FIGS. 1 and 2, or it may be unlocked to freely pivot along a horizontal axis with respect to the load-carrying portion 13, as shown in FIG. 3. Also, the handle portion may be locked in a folded-together position with the load-carrying portion, as shown in FIG. 6. Structure that may be employed to accomplish this result is shown in FIGS. 1 through 4 and 6. The handle portion 12 may be affixed to a horizontal tubular member 47, through which is positioned a smaller rod or tubular member 48 which is fixed to base structure 26, 41 of the load-carrying portion, the smaller tube or rod 48 being seen in FIGS. 2 and 4. The outer tube 47 is pivotable about the inner rod 48, permitting the handle assembly 12 to pivot with respect to the load-carrying portion 13. In order to lock the handle portion 12 into a desired position, i.e., the upright, hand truck position shown in FIG. 1 or the folded-together, storage position shown in FIG. 6, one or more locking pins 49 are slipped through the outer tube 47 and through the inner rod or tube 48 with the handle assembly in the appropriate position, holes being provided in the tubes for this purpose.

The outer bars 19 and 22 of the handle assembly 12 are affixed to the pivot tube 47, approximately on center with the tube 47, as shown for example in FIGS. 1, 3 and 4. However, as noted above, the central bar 21 preferably is offset rearwardly from the other two bars 19 and 22, and it may be secured to the pivot tube 47 as shown in FIG. 2. A sleeve 51 affixed to the outer pivot tube 47 extends upwardly, and the center handle bar 21 extends into it, locked in place therein by another locking pin 52. At the top of the center bar 21, that bar is secured to the top arch 23 of the other bars via a removable bolt 53 or other appropriate fastener (FIG. 1). The outer bars may be removed, if desired, if the installer prefers not to have them included. As shown in FIG. 6, the bolt 53 at the top of the bar may be held in place by a wing nut 54, for easy removal.

Although FIG. 6 shows the wheels 24 in the raised position for storage, the installer may wish to have them down, in the operative position, for ease in rolling the implement into storage in his vehicle or elsewhere.

As shown in FIG. 3, there may be provided four glide extensions 56, preferably of tubular configuration similar to the glides 17 themselves, for adding more width to the pressing path of the implement 10. The glide extensions 56 may be connectable into the ends of the glides 17 via cylindrical inserts 57 press-fit into the ends of the glide extensions, and insertable tightly into the ends of glides 17. They aid in the speed in which the pressing of the floor covering can be accomplished.

For use of the implement 10 on relatively hard surfaces such as linoleum, the glides 17 (and extensions 56, if used) may be covered by "socks" of soft fabric material 58, as shown in dashed lines in FIG. 2. This helps the implement glide, as well as picking up small particles that might otherwise scratch the flooring.

In operation of the floor covering installation implement 10, the installer 11 may first remove the implement 10 from his vehicle in the folded-together position of storage shown in FIG. 6, then remove the pins 49 to enable the handle assembly 12 to be freely pivoting, then he reinserts the pins 49 with the handle assembly in the right-angle, upright position shown in FIG. 1, to lock it in that position for use as a hand truck. The installer may then load his tool box 14 full of floor covering installation tools onto the hand truck as shown in FIG. 1, and the slots 33 in the glides 17, along with the stops 34, hold the tool box securely in position against side-to-side movement and fore-and-aft movement. On top of the tool box 14 may be stacked the containers 18 of adhesive material. When the installer has wheeled the hand truck, tool box and materials to the job, and when he has laid the floor covering or portions of it on the floor, he will then use the installation implement 10 for pressing the floor covering tightly against the floor to assure good adhesion. For this, he releases the handle assembly locking pins 49 to make the handle assembly 12 freely pivotable, as in FIG. 3. For this purpose, the wheels 24 may or may not be swung upwardly to the raised position shown in FIG. 3. As indicated in FIG. 2, the wheels in their normal position are slightly above the level of the floor surface 20, when the glides 17 are both resting on the floor. If the floor covering is relatively hard, such as linoleum, and the implement 10 is to be used normally, with both glides 17 contacting the linoleum, than the wheels need not be moved to the upward position. However, if fairly deep carpeting is being glued down, the wheels might engage the carpeting sufficiently to lessen the pressure on the carpeting from the glides 17, and in that case the wheels should be moved to the upper position. Also, if it is desired to concentrate the weight of the implement 10 and the tool box 14 on the rear glide 17, for putting greater pressure on the floor coverings, by tilting the implement back somewhat to raise the front glide 17 above the surface, then the wheels should be moved up, and the handle assembly 12 locked in the upright position as in the hand truck configuration of FIG. 1.

As discussed above, the installer connects the glide extensions 56 onto the ends of the glides 17 in the event he wants to extend the width of the pressing path of the implement. The extensions make the pressing operation even more efficient, especially as compared to prior art rollers, which were typically only 1 ft. 6 in. wide. The implement of the invention may be 2 ft. 3 in. wide, extendable by 3 in., 6 in., or 9 in. extensions to 2 ft. 9 in., 3 ft. 3 in. or 3 ft. 9 in. wide. Also, two presses 10 may be connected together via the tubular glides 17 and cylindrical inserts 57, with or without extensions, to form a far wider pressing path.

FIG. 7 shows an alternative, simpler embodiment of the invention, not including wheels or capability of use as a hand truck. A pressing implement 60 according to this embodiment of the invention simply comprises a pair of glides 17 identical with those of the first embodiment, structural members 61 extending between the glides, including stops 34, and glide retainers 32 fitted into the glides to hold them in position as in the earlier described embodiment. A handle 21 simply comprises the middle bar of the implement 10, pivotable with respect to the glides and structural members similarly to the other embodiment. Again, there are cutout areas 33 in the tubular glides 17 which, along with the stops 34, retain the installer's tool box (not shown in FIG. 7) securely in place as a weight for the press 60, as in the previous embodiment. In this embodiment, the pivot tube 47 at the bottom of the handle assembly may be pivotally connected to the remainder of the implement 60 as in the other embodiment, with an inner bar or tube 48 (see, e.g., FIG. 2) extending therethrough and being connected to the structural member 61, or alternate suitable pivoting arrangements may be used. In either event, the handle 21 preferably is capable of being locked in the folded-together position as shown for the implement 10 in FIG. 6, and for this purpose one or more position lock pins 49 may be included to pass through appropriately located holes in the pivot bar 47, as in the other embodiment.

The preferred embodiment described herein is intended to be purely illustrative, and not limiting of the scope of the invention. Other embodiments and variations will be apparent to those skilled in the art and may be made without departing from the essence and scope of the invention as defined in the following claims.

I claim:

1. A hand truck and tool for use in installing floor coverings, comprising:

a handle portion;

a load-carrying portion pivotally connected to the handle portion along a horizontal pivot axis, such that the handle portion can be swung downwardly or upwardly with respect to the load-carrying portion as the latter rests on a floor or other surface, the load-carrying portion including means for receiving a tool box of floor covering installation tools, and also including a pair of floor covering engaging glides at its bottom, extending transversely to a path of travel of the tool and positioned to engage the surface of a floor covering material to slide over it and press it into tight engagement with adhesive on a floor when the glides are moved over the floor covering surface with the weight of the tool box on the load-carrying portion;

means associated with the handle portion and the load-carrying portion for selectively locking the handle portion in a full upright position when desired, for use as a hand truck; and a pair of wheels connected to the load-carrying portion, behind the glides and adjacent to a rearward one of the glides, so arranged to contact a floor or other surface when the hand truck is tipped back, the wheels being connected to the load-carrying portion such that they are elevated above the floor when the glides are in contact with the floor.

2. The apparatus of claim 1, wherein the handle portion includes means forming a recess for nesting a stack of cylindrical drums of material supported on top of the tool box when the apparatus is used as a hand truck with the handle portion in full upright position.

3. The appartus of claim 1, wherein the means for receiving a tool box includes means for cradling the tool box for closely holding it in position against movement side-to-side and fore-and-aft.

4. A hand truck and tool for use in installing floor coverings, comprising:

a handle portion;

a load-carrying portion pivotally connected to the handle portion along a horizontal pivot axis, the load-carrying portion including means for receiving a tool box of floor covering installation tools, and also including a pair of floor covering engaging glides at its bottom, positioned to engage the surface of a floor covering material to slide over it and press it into tight engagement with adhesive on a floor when the glides are moved over the floor covering surface with the weight of the tool box on the load-carrying portion;

means associated with the handle portion and the load-carrying portion for selectively locking the handle portion in a full upright position when desired, for use as a hand truck; and a pair of wheels connected to the load-carrying portion, behind the glides, for contacting a floor or other surface when the hand truck is tipped back and the wheels being connected to the load-carrying portion such that they are elevated above the floor when the glides are in contact with the floor, and further including means for swinging each wheel up away from the floor, along an axis perpendicular to the wheel's axis of rotation.

5. A hand truck and tool for use in installing floor coverings, comprising:

a handle portion;

a load-carrying portion pivotally connected to the handle portion along a horizontal pivot axis, the load-carrying portion including means for receiving a tool box of floor covering installation tools, and also including a pair of floor covering engaging glides at its bottom, positioned to engage the surface of a floor covering material to slide over it and press it into tight engagement with adhesive on a floor when the glides are moved over the floor covering surface with the weight of the tool box on the load-carrying portion;

means associated with the handle portion and the load-carrying portion for selectively locking the handle portion in a full upright position when desired, for use as a hand truck; and a pair of wheels connected to the load-carrying portion, behind the glides, for contacting a floor or other surface when the hand truck is tipped back, and including means for swinging each wheel up away from the floor, along an axis perpendicular to the wheel's axis of rotation.

6. A hand truck and tool for use in installing floor coverings, comprising:

a handle portion;

a load-carrying portion pivotally connected to the handle portion along a horizontal pivot axis, the load-carrying portion including means for receiving a tool box of floor covering installation tools, and also including a pair of floor covering engaging glides at its bottom, positioned to engage the surface of a floor covering material to slide over it and press it into tight engagement with adhesive on a floor when the glides are moved over the floor covering surface with the weight of the tool box on the load-carrying portion;

means associated with the handle portion and the load-carrying portion for selectively locking the handle portion in a full upright position when desired, for use as a hand truck;

a pair of wheels connected to the load-carrying portion, behind the glides, for contacting a floor or other surface when the hand truck is tipped back; and the handle portion including three bars extending longitudinally therein, a center one of the three bars being slightly aft of the other two, forming a recess for nesting a stack of cylindrical drums of material supported on top of the tool box when the apparatus is used as a hand truck with the handle portion in full upright position.

7. The apparatus of claim 6, including removable connecting means associated with the center bar, for permitting removal of the center bar when desired.

8. A hand truck and tool for use in installing floor coverings, comprising:

a handle portion;

a load-carrying portion pivotally connected to the handle portion along a horizontal pivot axis, the load-carrying portion including means for receiving a tool box of floor covering installation tools, and also including a pair of floor covering engaging glides at its bottom, positioned to engage the surface of a floor covering material to slide over it and press it into tight engagement with adhesive on a floor when the glides are moved over the floor covering surface with the weight of the tool box on the load-carrying portion;

means associated with the handle portion and the load-carrying portion for selectively locking the handle portion in a full upright position when desired, for use as a hand truck;

a pair of wheels connected to the load-carrying portion, behind the glides, for contacting a floor or other surface when the hand truck is tipped back, and wherein the floor covering engaging glides comprise a pair of spaced parallel tubular members, with a platform between and connected to the two glides, and each glide having an elongated cut out area oriented upwardly and inwardly toward the platform, such that the bottom of the tool box fits closely within the cutout areas, whereby the tool box is cradled and held in position against movement on the platform.

9. The apparatus of claim 8, further including means for adjusting the width of the platform and thus the spacing between the tubular members, to accommodate various widths of tool boxes.

10. A hand truck and tool for use in installing floor coverings, comprising:
   a handle portion;
   a load-carrying portion pivotally connected to the handle portion along a horizontal pivot axis, the load-carrying portion including means for receiving a tool box of floor covering engaging glides at its bottom, positioned to engage the surface of a floor covering material to slide over it and press it into tight engagement with adhesive on a floor when the glides are moved over the floor covering surface with the weight of the tool box on the load-carrying portion;
   means associated with the handle portion and the load-carrying portion for selectively locking the handle portion in a full upright position when desired, for use as a hand truck;
   a pair of wheels connected to the load-carrying portion, behind the glides, for contacting a floor or other surface when the hand truck is tipped back; and
   further including glide extensions for connecting to the ends of the glides, for increasing the width of floor covering that can be pressed with the apparatus.

11. The apparatus of claim 10, wherein the glides comprise a pair of spaced parallel tubular members, and the glide extensions comprise four similar, shorter tubular sections, each having a cylindrical insert extending from one end, for fitting tightly in one end of a glide to extend the glide.

12. A hand truck and tool for use in installing floor coverings, comprising:
   a handle portion;
   a load-carrying portion pivotally connected to the handle portion along a horizontal pivot axis, the load-carrying portion including means for receiving a tool box of floor covering installation tools, and also including a pair of floor covering engaging glides at its bottom, positioned to engage the surface of a floor covering material to slide over it and press it into tight engagement with adhesive on a floor when the glides are moved over the floor covering surface with the weight of the tool box on the load-carrying portion;
   means associated with the handle portion and the load-carrying portion for selectively locking the handle portion in a full upright position when desired, for use as a hand truck;
   a pair of wheels connected to the load-carrying portion, behind the glides, for contacting a floor or other surface when the hand truck is tipped back; and
   further including means associated with the handle portion and the load-carrying portion for selectively locking the two portions in a folded-together position, for carrying and storage.

13. A press for use in installation of glue-down floor coverings such as carpet or linoleum, for utilizing the weight of the installer's tool box to press the floor coverings into contact with adhesive, comprising:
   a pair of parallel, spaced apart floor covering engaging glides, oriented transversely to the path of travel of the press;
   structural members connected to and extending between the glides, positioned to support the tool box;
   a handle pivotally connected to the structural members along a horizontal pivot axis and extending generally rearwardly from the glides for pushing the press along a floor covering with the tool box held thereon for weight;
   means associated with the handle and the structural members for selectively locking the handle and the structural members and glides in a folded-together position for carrying and storage, and for selectively permitting free pivoting of the handle with respect to the structural members; and
   means for cradling the tool box on the press to hold it in position against movement side-to-side and fore-and-aft.

14. A press according to claim 13, wherein the floor covering engaging glides comprise a pair of spaced parallel tubular members, each having an elongated cut out area oriented upwardly and inwardly toward the structural members, such that the bottom of the tool box is cradled and held in position against movement on the structural members.

15. A press according to claim 14, further including means associated with the structural members for adjusting the spacing between the glides to accommodate various widths of tool boxes.

* * * * *